Patented Apr. 8, 1952

2,591,777

UNITED STATES PATENT OFFICE 2,591,777

PROCESS OF FORMING A MACHINING LUBRICANT UPON MOLYBDENUM

Dwain B. Bowen, Los Angeles, Calif., assignor, by mesne assignments, to the United States of America as represented by the Secretary of the Navy No Drawing. Application May 3, 1946,
Serial No. 667,114

6 Claims. (Cl. 148—6.24)

This invention relates to a process for machining molybdenum and more particularly to a process for forming a machining lubricant for molybdenum at the cutting edge of the machine tool.

Heretofore the machining of molybdenum was considered a difficult process due to the extreme hardness of the metal and the consequent rapid deterioration of the cutting edges of cutting tools employed. Even molybdenum specially treated for machining would quickly dull the cutting tool, thereby making it a laborious and costly process. However molybdenum sulfide is known to be an excellent lubricant, if it could be effectively and continuously applied at the cutting edge of the machine tool. This invention provides a novel means for forming molybdenum sulfide on the surface of molybdenum being cut simultaneously with the cutting action of the cutting tool.

It is accordingly an object of this invention to provide a novel process for machining molybdenum.

A further object of this invention is to provide a process for chemically forming a lubricant upon the surface of molybdeum being machined simultaneously with the cutting action of the machining tool.

A still further object of this invention is to provide a novel process for chemically forming a lubricant upon the surface of molybdenum being machined utilizing heat generated by the cutting action of the cutting tool to carry out the chemical reaction.

Still another object of this invention it to provide a novel process for forming molybdenum sulphide upon the surface of molybdenum being machined utilizing heat generated by the machining tool to form said molybdenum sulphide.

A further object of this invention is to provide a novel process for forming molybdenum sulphide upon the surface of molybdenum being machined which comprises applying a sulphide to the surface of the molybdenum and chemically combining said sulphide with the molybdenum my utilizing heat generated by the machining tool to carry out the chemical combination.

These and other objects will be apparent from the following specification and claims.

The process for forming a lubricant coating upon the surface of a molybdenum sample being machined comprises the steps of continuously applying a sulphur compound to the surface of the sample while the cutting action is being carried on. It has been discovered that molybdenum sulphide provides an excellent lubricating agent which may advantageously be employed as an aid in reducing the extreme hardness of molybdenum in order to facilitate machining of such metal.

While any sulphur compound which will chemically combine with molybdenum, to form molybdenum sulphide may be employed, carbon disulphide has been used with excellent results. The carbon disulphide, which exists in a liquid state, may be continuously applied in the region of the cutting tool while the cutting action is carried on by means of standard hydraulic systems as are commonly employed to supply coolants to the region of cutting tools. Although carbon disulphide, in itself, does not act as a lubricant, this substance readily chemically reacts with molybdenum to form molybdenum sulphide upon the surface of the molybdenum when subjected to the elevated temperatures commonly developed as a result of the cutting action of a tool. The process readily lends itself to practical applications since it is a continuous process and may be carried on without interruption of normal machining procedure. It will readily be understood that higher cutting speeds and longer tool life are attained, since molybdenum sulphide provides an excellent lubricant upon the surface, the lubricant being continuously formed while the machining process is carried out.

What is claimed is:

1. The process of machining molybdenum which comprises applying carbon disulphide upon the surface of molybdenum work being machined by a machine tool and utilizing the heat generated by said tool to chemically form a lubricant coating upon the work surface of said molybdenum.

2. In the process of machining molybdenum, the steps of applying carbon disulphide continuously to the surface of the molybdenum workpiece and forming molybdenum sulphide at the point of machining under the elevated temperature conditions developed by the machining operation.

3. The process of forming a lubricant upon the surface of molybdenum during a machining operation comprising applying carbon disulphide continuously to the surface of the molybdenum workpiece and forming molybdenum sulphide at the point of machining by the chemical reaction of carbon disulphide and molybdenum at the elevated temperature generated by said machining operation.

4. The process of machining molybdenum, which comprises applying carbon disulphide to the surface of molybdenum work being machined by a tool to form molybdenum sulphide continuously at the elevated temperature developed by said tool upon said molybdenum work surface at the point of machining.

5. The process of machining molybdenum, which comprises continuously applying carbon disulphide to the surface of molybdenum work being machined by a cutting tool and chemically forming molybdenum sulphide continuously at the elevated temperature developed as a result of the cutting action of said tool upon said molybdenum work surface.

6. The process of machining molybdenum, which comprises continuously applying carbon disulphide to the surface of molybdenum work being machined by a cutting tool to form chemically molybdenum sulphide at the point of cutting simultaneously with the cutting action of said tool by the heat generated by the machining operation.

DWAIN B. BOWEN.

REFERENCES CITED

The following references are of record in the file of this patent:

UNITED STATES PATENTS

| Number | Name | Date |
|---|---|---|
| 2,227,952 | Zimmer | Jan. 7, 1941 |
| 2,297,909 | Neely et al. | Oct. 6, 1942 |
| 2,350,491 | Butler et al. | June 6, 1944 |
| 2,412,082 | Gabriel | Dec. 3, 1946 |
| 2,420,886 | Laffoon, Jr. | May 20, 1947 |